United States Patent
Pohle et al.

(10) Patent No.: US 10,573,472 B2
(45) Date of Patent: Feb. 25, 2020

(54) METHOD AND DEVICE FOR PRODUCING CONTACT ELEMENTS FOR ELECTRICAL SWITCHING CONTACTS

(71) Applicant: Siemens Aktiengesellschaft, München (DE)

(72) Inventors: Dirk Pohle, Berlin (DE); Wolfgang Rossner, Holzkirchen (DE); Klaus Schachtschneider, Berlin (DE); Carsten Schuh, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 345 days.

(21) Appl. No.: 14/898,764

(22) PCT Filed: Jun. 4, 2014

(86) PCT No.: PCT/EP2014/061605
§ 371 (c)(1),
(2) Date: Dec. 16, 2015

(87) PCT Pub. No.: WO2014/202390
PCT Pub. Date: Dec. 24, 2014

(65) Prior Publication Data
US 2016/0141124 A1    May 19, 2016

(30) Foreign Application Priority Data
Jun. 20, 2013   (DE) .................. 10 2013 211 659

(51) Int. Cl.
*H01H 11/04*    (2006.01)
*B22F 3/105*    (2006.01)
(Continued)

(52) U.S. Cl.
CPC ............ *H01H 11/04* (2013.01); *B22F 3/105* (2013.01); *B22F 5/12* (2013.01); *C04B 35/5626* (2013.01);
(Continued)

(58) Field of Classification Search
CPC .... B22F 3/105; B22F 2003/1051; B22F 7/08; H01L 11/04; H01L 11/041; H01L 11/048;
(Continued)

(56) References Cited

U.S. PATENT DOCUMENTS

| 5,726,407 A | 3/1998 | Okutomi et al. |
| 6,383,446 B1 | 5/2002 | Tokita |
| 8,869,393 B2 | 10/2014 | Gentsch et al. |

FOREIGN PATENT DOCUMENTS

| DE | 102005003812 A1 | 10/2006 |
| DE | 60033331 T2 | 10/2007 |

(Continued)

OTHER PUBLICATIONS

Translation for JP 09-237555, Sep. 9, 1977.*
(Continued)

*Primary Examiner* — C Melissa Koslow
(74) *Attorney, Agent, or Firm* — Harness, Dickey & Pierce, P.L.C.

(57) ABSTRACT

In order to optimize the production of electrical switching contacts, particularly for vacuum tubes, a Field Assisted Sintering Technology process is proposed in which an electrical or electromagnetic field supports and/or produces a sintering process for producing semifinished contact elements for electrical switching contacts, contact elements for electrical switching contacts and/or electrical switching contacts, particularly for vacuum tubes. According to an embodiment, the contact material prior to the sintering process is present in such a form that the material compo- (Continued)

sition of the contact material and/or at least one property of the contact material varies in at least one body direction of the finished contact element.

5 Claims, 10 Drawing Sheets

(51) Int. Cl.
    *B22F 5/12* (2006.01)
    *C04B 35/56* (2006.01)
(52) U.S. Cl.
    CPC ... *B22F 2003/1053* (2013.01); *B22F 2301/10* (2013.01); *B22F 2301/20* (2013.01); *B22F 2301/255* (2013.01); *B22F 2302/10* (2013.01); *H01H 2201/022* (2013.01)
(58) Field of Classification Search
    CPC ..... H01L 11/06; H01L 1/0203; H01L 33/664; H01L 2201/022
    USPC ............................................ 218/118; 29/875
    See application file for complete search history.

(56) References Cited

FOREIGN PATENT DOCUMENTS

| DE | 102011082593 A1 | | 3/2013 |
| EP | 731478 | * | 9/1996 |
| EP | 0731478 A2 | | 9/1996 |
| GB | 1481006 A | | 7/1977 |
| JP | H0520961 A | | 1/1993 |
| JP | 09-237555 | * | 9/1997 |
| JP | H09237555 A | | 9/1997 |
| JP | H10340654 A | | 12/1998 |
| JP | H1123971 A | | 1/1999 |
| JP | H11232971 A | | 8/1999 |
| JP | 2006228454 A | | 8/2006 |

OTHER PUBLICATIONS

International Search Report PCT/ISA/210 for International Application No. PCT/EP2014/061605 dated Aug. 28, 2014.
Written Opinion of the International Searching Authority PCT/ISA/237 for International Application No. PCT/EP2014/061605 dated Aug. 28, 2014.

* cited by examiner

METHOD AND DEVICE FOR PRODUCING CONTACT ELEMENTS FOR ELECTRICAL SWITCHING CONTACTS

PRIORITY STATEMENT

This application is the national phase under 35 U.S.C. § 371 of PCT International Application No. PCT/EP2014/061605 which has an International filing date of Jun. 4, 2014, which designated the United States of America and which claims priority to German patent application number DE102013211659.4 filed Jun. 20, 2013, the entire contents of which are hereby incorporated herein by reference.

FIELD

An embodiment of the invention generally relates to contact elements for electrical switching contacts for every voltage range. In particular, an embodiment of the invention relates to contact elements for such switching contacts as are used for vacuum tubes (vacuum switching tubes). More specifically, an embodiment of the invention relates to the production of semi-finished contact element products for electrical switching contacts, to the production of contact elements for electrical switching contacts, and to the production of electrical switching contacts, as well as to a device for producing these parts.

BACKGROUND

Electrical switching contacts in vacuum tubes must meet various requirements. The vacuum tubes in the closed state are to conduct electricity, which is why a contact material having very high electrical conductivity is employed for the contact elements of the switching contacts. On account of the high contact pressures and switching speeds high mechanical, thermo-mechanical, and thermo-physical loads arise as well as extreme temperature loads due to flashing arcs during switching on and off. Therefore, a mixture of two or more metallic or non-metallic components is mostly used as a contact material. The mixture comprises at least one highly conductive component and one component having high mechanical and thermal resilience. Examples thereof include CuCr or WCAg or WCu, wherein Cu (copper) or Ag (silver), respectively, provides the high electrical conductivity, and Cr (chromium), WC (tungsten carbide), or W (tungsten), respectively, is responsible for the resistance to abrasion and the positive mechanical properties.

Methods in which an electric or electromagnetic field supports and/or instigates a sintering process are known in the prior art and are collectively referred to by the term FAST (field-assisted sintering technologies).

It is known for electrical switching contacts to be produced using a FAST method.

SUMMARY

An embodiment of the present invention increases or even optimizes the production of electrical switching contacts. An embodiment is directed to a method, and an embodiment is directed to a device. Advantageous embodiments of the invention are stated in the claims.

An embodiment of the invention lies in that the contact material prior to the sintering process is provided in such a manner that the material composition of the contact material and/or at least one property of the contact material are/is modified in at least one body direction of the finished contact element. In other words, an embodiment of the invention proposes contact elements which have been produced by way of FAST, having modified material properties. In this way, the advantageous properties of the known FAST methods may be particularly well applied in the production of suitable contact elements. Prior to discussing the core aspect of the invention in a more detailed manner, some of these advantageous properties will be explained in more detail below.

It is also the case in all embodiments of the invention that have been described last and in which a sintering process is carried out on a metallic substrate that the contact material prior to the sintering process may be provided in order to produce switching contacts having particularly advantageous properties in such a manner that the material composition of the contact material and/or at least one property of the contact material are/is modified in at least one body direction of the finished contact element. In particular, that component of the contact material that is to be incorporated into the contact carrier may be available in a gradually modified material composition in the production of a unipartite contact carrier-contact element combination, or else a gradually modified material composition of the material of the second contact element portion is provided by means of a FAST method on an already available first contact element portion when the second contact element portion is being formed. Many further applications are possible, for example with the aid of dopings or when multicomponent powders are used.

BRIEF DESCRIPTION OF THE DRAWINGS

The properties, features, and advantages of this invention which have been described above, and the manner in which the former are achieved, will be understood more clearly and in more detail in the context of the following description of the example embodiments which will be discussed in more detail in conjunction with the drawings in which.

DETAILED DESCRIPTION OF THE EXAMPLE EMBODIMENTS

Figure 1:
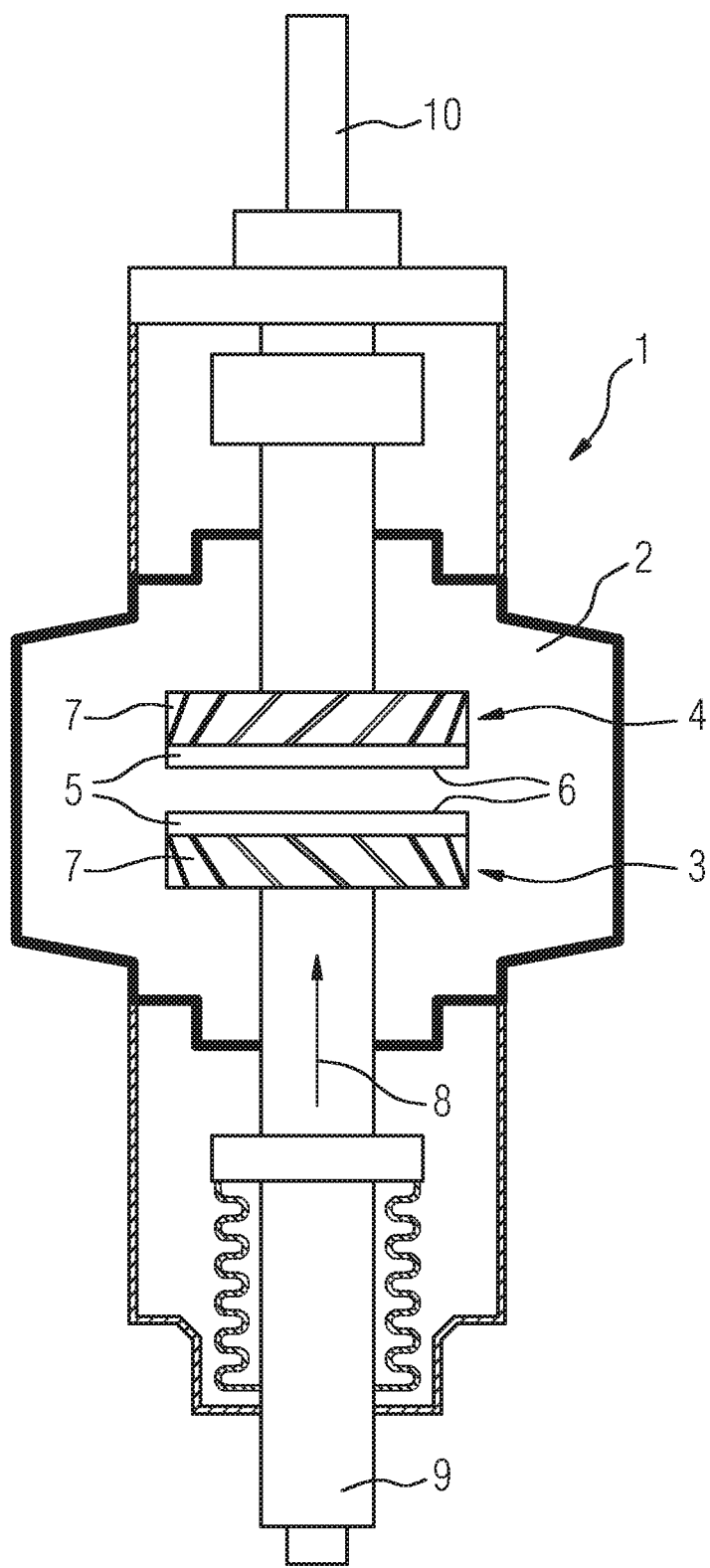
FIG. 1 shows a vacuum tube.

All figures show embodiments of the invention in a merely schematic manner and with the essential components thereof. Here, the same reference signs refer to elements having the same or an equivalent function.

An embodiment of the invention lies in that the contact material prior to the sintering process is provided in such a manner that the material composition of the contact material and/or at least one property of the contact material are/is modified in at least one body direction of the finished contact element. In other words, an embodiment of the invention proposes contact elements which have been produced by way of FAST, having modified material properties. In this way, the advantageous properties of the known FAST methods may be particularly well applied in the production of suitable contact elements. Prior to discussing the core aspect of the invention in a more detailed manner, some of these advantageous properties will be explained in more detail below.

The contact material used for the contact elements is of great importance in the production of switching contacts for vacuum tubes, since the former has to meet specific requirements. It is known that the switching performance of the contact material is heavily influenced by porosity, grain-size distribution, doping and contaminations, density, hardness, and other parameters. An illustrative example thereof is micropores, in particular surface-proximate pores, which during fusing of the contact material may lead to the vacuum being compromised and to possible failure of the vacuum tube. Another issue lies in the dissolubility of Cr in Cu. While this dissolubility is indeed only very minor, even small traces of Cr dissolved in Cu already lead to a perceptible reduction in the electrical conductivity of the copper. Furthermore, the spatial distribution of the components has a role to play.

Comparatively large zones with just one component have to be avoided.

Currently, contact elements, which as contact elements for vacuum tubes are often required in the form of contact disks, using suitable contact materials are mostly produced with the aid of methods which are quite varied and inter alia include hot pressing, sintering, sintering and subsequent infiltration, casting and forming, or arc remelting. These methods in terms of machinery are very complex, take much time, and/or lead to contact elements having inadequate quality. A very high reject rate arises on account thereof, on the one hand. On the other hand, due to the often variable material quality, quality testing of the contact elements inter alia for hardness, porosity, and conductivity is very complex.

By using a FAST method, production of contact elements, specifically both of semi-finished products, for example in disk form or annular form, which subsequently have to be post-machined, as well as of already completely shaped contact elements (net-shape method), which in comparison with the usual production methods is far more rapid and cost-effective is possible.

At the same time, the contact elements produced by means of FAST methods are also superior to the contact elements produced by means of traditional methods in terms of quality. These contact elements in the case of adapted process management are particularly distinguished by the following properties: density of almost 100% and thus minimal porosity, small grain or crystallite sizes, respectively, high purity, and an almost total absence of components dissolving into one another. Moreover, the material properties of these contact elements are reproducible in a very accurate manner, such that variations in quality as are known from the prior art no longer arise. As a result the reject rate is much lower and quality testing is significantly less complex.

The employment of FAST is thus also very suitable for producing contact elements, because specific properties of the contact material may be influenced in a highly targeted manner and thus be adapted to special requirements by selecting suitable process parameters. For example, a defined porosity may be created by employing lower temperatures and pressures, or targeted dissolving of components at the grain boundaries may be achieved by an extended dwelling time at maximum temperature, which during cooling leads to the formation of precipitation structures and/or to a defined formation of gradients.

If semi-finished products which subsequently are post-machined are produced, for example in the manner that slots are machined into disk-shaped blanks with the aid of a milling cutter, in the case of a non-porous structure cooling lubricants may be used for the milling cutter without the risk of the cooling lubricant penetrating into the contact element. Machining may then be carried out more rapidly and the tools used in machining are subjected to less wear.

Depending on the requirements, various FAST methods may be used in the production of the contact elements. Suitable FAST methods include in particular electric current assisted/activated sintering (ECAS), spark plasma sintering (SPS), electro sinter forging (ESF), pulsed electrical current sintering (PECS), current activated pressure assisted densification (CAPAD), electric pulse assisted consolidation (EPAC), plasma activated sintering (PAS), resistant sintering (RS), electrical discharge compaction (EDC), dynamic magnetic compaction (DMC).

It is a common feature of all FAST methods which are included in the scope of embodiments of this invention that an electric or electromagnetic field supports the production process of the semi-finished products, for example in the form of disk-shaped contact elements, or the production process of the finished contact elements, respectively. Depending on the type of the FAST method, this production process is, for example, sintering, hot or cold pressing, uniaxial or isostatic pressing. In other words, a FAST method is understood to be a method in which an electric or electromagnetic field is used for supporting or instigating a sintering process. In this way, a correspondingly modified hot or cold pressing method, in which by way of a superimposed current a sintering process is initiated by the resulting heat according to Joule's law, is also understood to be a FAST method in the context of embodiments of the invention, for example.

There are various possibilities here for adjusting the electric or electromagnetic field, for example amperage, voltage, voltage increase, pulse duration, pulse count, frequency. These parameters inter alia influence grain size, porosity, strength, and purity of the contact materials, and are optimized depending on requirements, that is to say for each material and each application.

Other parameters which are relevant to production include the heating and cooling rates, and the dwelling time at maximum temperature. Depending on requirements and the FAST process being used, the parameters may be readily varied to the material being produced. For production of the contact elements, the FAST method employed is preferably conceived such that the dwelling time of the sintered product at the maximum sintering temperature is as short as possible. The dwelling time is preferably between less than a few minutes, typically less than five minutes in an industrial production process, to less than a few seconds. In this way, production rates which are high and economically highly attractive may be implemented. Moreover, the FAST method employed is preferably conceived such that very rapid heating and cooling rates are implemented. The heating and cooling rates are preferably in excess of 100 K/min. On account of the short dwelling time and/or the high heating and cooling rates, disadvantageous thermodynamic effects, such as phase formation, phase decomposition, phase reactions, interfusion may be suppressed.

Moreover, material compositions which are incompatible with usual production methods and thus cannot be combined to form a workpiece may be utilized on account thereof. Material compositions of this type are now possible and form a homogenous and finely distributed microstructure in such a manner that both conductivity as well as resilience to arcs is ensured at any single point of the contact element.

According to an embodiment of the invention, contact materials having a microstructure which is defined only by the specification of the primary materials employed, which are mostly available in pulverulent form, may be produced. In one example embodiment of the invention, nanoscale powders or additives, by way of the use of which microstructures having nanoscale phases or grain structures may be constituted, are employed for producing the contact material. In contrast to all traditional production methods, this is possible because the pulverulent structures, on account of the very rapid process, are not or hardly modified. Phases having a structural size of less than 1 μm are in particular understood to be nanoscale phases here. Nanoparticulate structures of this type result in very high mechanical stability of the contact material, by way of superplasticity are able to better compensate for extreme tensions, and in the case of a suitable dimensional distribution of the phases and grains display high stability in ageing.

If pulverulent primary materials which are introduced into a press mold are employed in the FAST method, as is the case in spark plasma sintering (SPS), for example, which is preferably used, additives may moreover be admixed in a highly homogenously distributed manner as is not possible in the case of traditional production methods. In this way, the switching properties of the later contact element may be improved by adding tellurium or bismuth to the primary Cu and/or Cr powders, for example.

Moreover, and above all in the case of the net shape method, the production method when using pulverulent primary materials is considerably simplified in comparison with such traditional production methods in which a blank body, for example in the shape of a solid cylinder, is initially steadily created by remelting, this blank body having first to be shaped as desired, for example by slicing the cylinder in order for disk-shaped contact elements to be obtained.

Also, when pulverulent primary materials are used, the proportion of excess material may be considerably reduced by suitable measures, for example by way of a corresponding geometric embodiment of the press mold, in comparison with such traditional production methods in which blank bodies are first produced and the desired final shape is then achieved by material removal, for example by milling disk-shaped blanks to obtain annular contact elements.

If a net shape method is used such that post-machining of a semi-finished product is no longer necessary, the contact element may have a considerably lesser material thickness. Minimum dimensions such as required in the case of semi-finished products in order to enable the semi-finished product to be held for the purpose of machining, for example clamping or chucking the semi-finished product in a CNC milling machine, then no longer need to be kept available.

Embodiments of the invention are not limited to specific shapes of contact elements. Various contact geometries may be implemented in particular. Apart from simple plate contacts, axial magnet field (AMF) contacts, or radial magnet field (RMF) contacts may be implemented, for example, the latter in the form of helical contacts or slotted pot contacts, for example. These and other suitable contact geometries, with the aid of a positive influence of the arc, serve to avoid overheating and remelting of the contact surface during the phases of switching on and extinguishing, on the one hand, and the formation of anode spots during switching off of large currents, on the other hand.

Embodiments of the invention are likewise not limited to the material systems CuCr and WCAg, which have already been mentioned; they have been stated in an only example manner. Embodiments of the invention are applicable to any suitable material combination, the latter preferably being at least two components of which the one component is stable at high temperatures or reduces the welding tendency of the contacts, and the other component is highly conductive.

Embodiments of the invention are also not limited to specific applications. However, it is employable in a particularly advantageous manner in the production of contact elements for switching contacts for vacuum tubes for any voltage range. Other fields of application of contact elements produced according to the method according to the invention include, for example, switching contacts in contactors, relays, push-buttons, or switches having various switching outputs.

At least one embodiment of the present invention now proposes that the contact element is produced in such a manner that the material composition of the contact material and/or at least one property of the contact material are/is modified in at least one body direction of the contact element. The modification here is preferably gradual, that is to say in successive steps. Such a step-wise modification in one embodiment of the invention is sensitive in such a manner that a quasi-continuous or continuous modification is performed. Contact elements configured in such a manner may always be produced in a particularly simple manner when pulverulent primary materials are employed in the FAST method.

If such a gradual modification of the material composition is performed in the thickness direction of the contact element, it is then possible for the proportion of a component of the contact material to be modified in a defined manner, for example. The proportion of the component here may be increased or decreased, so as to achieve a desired modification of the properties of the contact element.

In one embodiment of the invention, the Cr proportion may thus be reduced down to zero in those regions of the CuCr contact element in which Cr is not required, without having to be without a high Cr proportion in those regions in which the latter is required for the functional capability of the contact element. Since the chromium particles are typically coarser than the copper particles, the pulverulent bulk density increases as the Cr proportion decreases, simplifying the FAST process and increasing productivity. An increased Cu proportion in the contact element results in higher electrical conductivity, leading to lower losses and to lower heating up of the vacuum tube. If pure Cu powder is used for the lowermost coating which faces the contact carrier, simpler and better connectivity to a Cu contact carrier results, since cost-effective soldering, brazing or welding methods may be used on account of material equality. Moreover, a potential for reducing costs results, since Cr powder is about double the price of Cu powder. The same correspondingly applies also to the other material components, for example to the tungsten proportion in WCu and to the tungsten carbide proportion in WCAg.

By way of a gradual modification of the material composition in the radial direction the movement of the arc may be positively influenced. In particular, it is then possible for the region in which the arc burns to be enlarged. On account thereof, the service life of the switching contact may be extended. On account of the FAST method being applied in the production of the contact element, it is possible for contact elements having very finely graduated modifications of the material composition, or of the material properties in the radial direction, respectively, to be produced.

In this way, a particularly great effect may be achieved in arc control. The production of such contact elements here is possible in a particularly simple manner, without individually produced contact element portions with in each case homogenous material compositions having to be interconnected in a complex manner, for example.

Applying a comparatively rapid FAST method, typically with process times of less than 30 minutes, in conjunction with maximum process temperatures below the melting temperature of Cu, moreover ensures that the intended variations in concentrations are not equalized during the sintering process on account of diffusing and dissolving processes. The material gradient in the pulverulent bulk material is maintained in the finished contact element. Therefore, FAST methods are particularly suitable for producing contact elements of this type, while traditional methods having sintering times of typically several hours are excluded as being unsuitable from the outset. Likewise excluded are production methods in which at least one component is subjected to the melt phase.

If pulverulent primary materials are employed, apart from the main components further additives, such as tellurium or bismuth, which serve for improving the switching properties, for example, may be added to the contact element in the same manner. Therefore, not only a chromium or tungsten gradient, but also a tellurium or bismuth gradient, may be set, for example. As a consequence of the method, this is not possible in the case of many traditional production methods for contact elements, such as arc remelting, for example.

If the production of in each case individual contact elements is performed in the implementation of the FAST process, the material composition, or the modification of the material composition, respectively, may be performed individually for each contact element. In this way, contact elements which are individually adapted to the respective application may be produced in a simple and cost-effective manner despite industrial mass production.

Moreover, in the production of the contact element one property of the contact material in at least one body direction of the contact element may be modified even in the case of the material composition being maintained, for example in that various grain sizes are used for at least one of the components of the contact material, such that a gradual modification of the grain size of this component results within the contact element. Summarizing, on account of a material composition and/or a material property and/or a structural property which are/is modified within the contact element, the possibility for optimizing the properties of the contact element results.

In one simple example embodiment, a graded pulverulent bulk material is used instead of a homogenous pulverulent mixture. The layer sequence of the gradient structure may alternatively also be constituted by stacking and laminating green tapes which have been cut to size. These green tapes which have been adapted in their material composition, for example by gradually varying the proportion of Cu and Cr, may be produced by tape casting, for example.

As will be explained in the following, it is furthermore particularly advantageous for the sintering process to the performed on a metallic substrate and on account thereof to produce semi-finished contact element products for electrical switching contacts, contact elements for electrical switching contacts, and/or electrical switching contacts, in particular for vacuum tubes. While sintering in the prior art always leads to objects which are entirely composed of a sintered material, the metallic substrate in this case is always an integral part of the later object. The substrate is either the contact carrier of the later switching contact, or else a portion of the later contact element. Such a kind of production is particularly simple to link to the core aspect of at least one embodiment of the present invention and enables a few particularly advantageous properties of the contact elements.

The methods which have already been mentioned above, for example hot pressing, sintering, or arc remelting, and which are currently usual in the production of the contact elements, are not only very complex, slow, and prone to quality issues. In the production of this type, more or less complex connection processes are also always required in order for the contact element to be connected to a contact carrier, so as to obtain a finished switching contact. Usually, the already completed contact elements are attached to the contact carriers with the aid of a soldering, brazing or welding process. This multi-step and slow procedure is one reason why the production of switching contacts is comparatively expensive. Apart from increased process costs, storage costs which are also comparatively high have to be absorbed.

It is thus a further aspect of at least one embodiment the present invention to carry out the sintering process on a metallic substrate and to produce semi-finished contact element products for electrical switching contacts, contact elements for electrical switching contacts, and/or electrical switching contacts, in particular for vacuum tubes, in this way. While sintering in the prior art always leads to objects which are entirely composed of sintered material, the metallic substrate in this case is always an integral part of the later object. The substrate is either the contact carrier of the later switching contact, or else a portion of the later contact element.

In the first case, the FAST method is used for producing a unipartite contact carrier-contact element combination. To this end, a region of an available contact carrier is modified by way of a FAST method in such a manner that this region may serve as a contact element. In other words, separately producing a contact element in a prior step is no longer required. Instead, a specific part of the contact carrier is modified in such a manner that it constitutes a contact element in terms of function.

This is preferably implemented in that the contact carrier already has at least one first component of the contact material and at least one second component of the contact material is incorporated into the contact carrier by way of a FAST method in such a manner that the latter is then located in a specific spatial region of the contact carrier. The contact material is pressed into softened carrier material, for example, and a material composition which largely corresponds to the material composition of traditionally produced contact elements is created in a surface-proximate region of the contact carrier which includes the surface.

By way of this type of production not only is a process step eliminated, such that a single-step and rapid process having a considerable potential for cost savings is now possible. The required quantity of individual components of the primary material may also be reduced, leading to cost savings and/or to undesirable side effects being removed.

In one embodiment of the invention, the contact carrier inter alia is composed of copper-based materials, for example. At the same time, the contact element must have a high chromium proportion, in particular on that surface that faces the clearance between open contacts and up to a specific depth of the contact element, since Cr increases hardness and abrasion resistance and simultaneously reduces abrasion and welding tendency. However, Cr has a disadvantageous effect on the conductivity of the contact element. Moreover, it leads to brittleness in the contact material. Moreover, chromium powder is about double the price of copper powder.

By way of the proposed way of production, in which Cr is incorporated into the Cu contact carrier, the chromium proportion in those regions of the contact element-carrier element combination where the latter is not required may be reduced, right up to a complete deletion of chromium in these regions. On account thereof, the total chromium proportion in the contact element-contact carrier combination is considerably lowered. At the same time, no reduction in the chromium proportion is provided in those regions where a high chromium proportion is required for the functional capability of the contact element.

The same correspondingly applies to contact materials based on WCu, such as are found in applications in high-voltage switches, for example, and to any other contact material in which at least one of the primary components is the same as the contact carrier material. The described type of single-step production of a contact carrier-contact element combination may be applied in an analogous manner to other contact materials which are composed of at least two components. Instead of Cr, above all tungsten and tungsten carbide are to be considered as components of the contact material which are capable of being incorporated into the contact carrier, the contact carrier preferably having Cu as a contact material component.

In a manner which is different from a bipartite construction of a switching contact in which the contact element always has a minimum material thickness of three to five millimeters of CuCr or WCu, for example, in as far as this contact element has been produced as a semi-finished product and prior to connecting to the contact carrier has had to be post-machined, the surface-proximate region of the contact carrier which can now be produced which assumes the function of the contact element may have a considerably smaller material thickness, for example a thickness of merely one millimeter of CuCr or WCu. On account thereof, there are savings in the contact material. At the same time, the contact carrier which is provided with the contact region, in other words the contact carrier-contact element combination, may be post-machined, for example by machining by way of a milling cutter.

By way of the proposed process, a functional region within the contact carrier is provided which assumes the function of the contact element. The single-step process is associated with large savings in time, since the connecting step which previously was inevitable has now been deleted. Moreover, less of that component (for example Cr, W) of the contact material that is primarily responsible for the mechanical properties of the contact element is required. The proportion of the other component of the contact material that is primarily responsible for the electrical properties of the contact element and which will typically be Cu, although in principle another electrically conductive material is also usable, is overall increased, since that component is present in the entire carrier element.

This leads to improved electrical conductivity of the entire component, leading to lower losses and to less heating of the vacuum tube. The novel production process removes the limitations of production which have been in place so far and permits new and flexible production procedures. At the same time, on account of a flexible layout of the contact carrier, novel designs and contact geometries may be implemented in a particularly simple way. Moreover, novel approaches in terms of material selection and structural configuration are possible.

The proposed method of an embodiment for directly producing a contact element-contact carrier combination is very particularly advantageous for switching contacts in the field of medium and high voltage engineering.

While it has been described above how the contact carrier itself also assumes the function of the contact element, it is proposed according to a further aspect of an embodiment of the present invention that the separation of contact carrier and contact element is maintained but that the contact element on its part is implemented so as to be multipartite. The procedure already described above, according to which the contact element is initially produced in the course of the FAST method, is maintained here.

According to this aspect, the contact element comprises at least two adjacent contact element portions. Here, a first contact element portion has been formed by a volume element which has been available prior to the commencement of the FAST method. A second contact element portion, which is connected to the first contact element portion, is produced by way of the FAST method. The volume element is preferably an electrically conducting body, in particular a solid metallic semi-finished product, for example in the form of a disk or of a ring. On account of the FAST method, the connection between the contact element portions is produced at the same time. In other words, the second contact element portion is constructed on top of the first contact element portion. The first contact element portion serves as a carrier for the second contact element portion.

As is the case in the previously described embodiment of the invention, in one preferred embodiment the connection between the contact element and the contact carrier is likewise produced by way of the FAST method, such that the additional step of connecting the contact element to the contact carrier, for example by soldering/brazing or welding, is deleted. In other words, the multipartite contact element is connected to the contact carrier by means of FAST. The production of the multipartite contact carrier and the connection to the contact carrier here again is preferably performed in a single process step. In other words, the FAST method is simultaneously employed for sintering contact material as well as for connecting the contact element to the contact carrier, so as to produce a switching contact.

In one embodiment of the invention, a CuCr contact element portion is produced on a semi-finished metallic product. If the semi-finished metallic product does not have a Cr proportion or has a smaller Cr proportion than the CuCr contact element portion, the overall proportion of Cr in the contact element is lowered, leading to higher electrical conductivity and thus to lower losses and to less heating of the vacuum tube. On account of the savings in Cr material, a potential for cost reduction results, since pulverulent Cr is about double the price of pulverulent Cu. The same correspondingly applies when other components, such as tungsten or tungsten carbide, for example, are used instead of chromium.

Moreover, a specific overall thickness of the contact element may be maintained in a cost-effective manner, leading to simpler post-processing, for example to an improved chucking capability during CNC milling. Moreover, the semi-finished metallic product may be embodied such that the tenacity of the contact element which has been formed on the semi-finished product is increased as compared with a variant without a volume element.

Above all, considerable savings in cost and time result when the multipartite contact element is placed directly onto the contact carrier and is processed in a single-step FAST process including both sintering of the pulverulent metal as well as connecting the contact material to the volume element and the volume element to the contact carrier in a materially integral manner.

It is also the case in all embodiments of the invention that have been described last and in which a sintering process is carried out on a metallic substrate that the contact material prior to the sintering process may be provided in order to produce switching contacts having particularly advantageous properties in such a manner that the material composition of the contact material and/or at least one property of the contact material are/is modified in at least one body direction of the finished contact element. In particular, that component of the contact material that is to be incorporated into the contact carrier may be available in a gradually modified material composition in the production of a unipartite contact carrier-contact element combination, or else a gradually modified material composition of the material of the second contact element portion is provided by means of a FAST method on an already available first contact element portion when the second contact element portion is being formed. Many further applications are possible, for example with the aid of dopings or when multicomponent powders are used.

In a vacuum tube 1 such as is used for electrical power switches, for example, the switching assembly which is disposed in a switching chamber 2 comprises, for example, two switching contacts 3, 4 which are coaxially disposed and have contact elements 5 of which the switching faces (contact surfaces) 6 face one another, see FIG. 1. The contact elements 5 sit on contact carriers 7. In the example which is illustrated here, one of the switching contacts 3 is movable in the axial direction 8. For this purpose, the movable switching contact 3 is connected to a movable connection bolt 9 while the fixed switching contact 4 is connected to a fixed connection bolt 10.

In the following, methods for producing semi-finished contact element products for electrical switching contacts 3, 4 for vacuum tubes 1, methods for producing contact elements 5 for electrical switching contacts 3, 4 for vacuum tubes 1, and methods for producing electrical switching contacts 3, 4 for vacuum tubes 1 will be described in an example manner. It is a common feature of all these methods that production of the contact element 5 is performed by means of a FAST process. This means that an electric or electromagnetic field supports production in that this field supports and/or instigates a sintering procedure.

Figure 2:
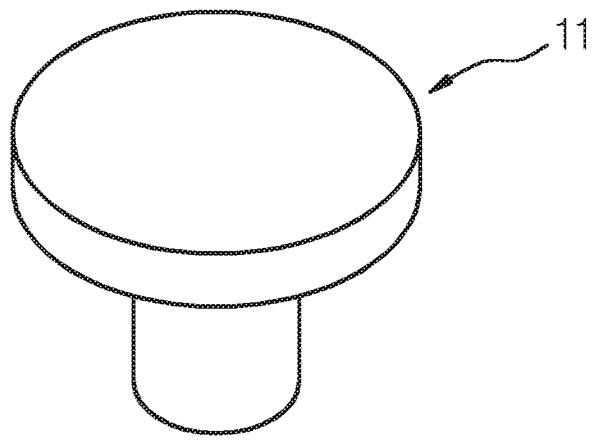
FIG. 2 shows a first switching contact.
Figure 3:
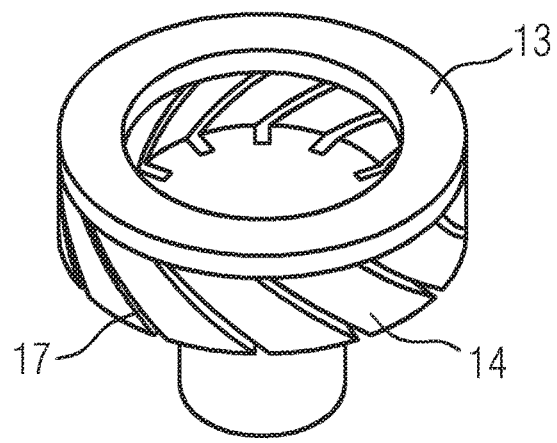
FIG. 3 shows a second switching contact.
Figure 4:
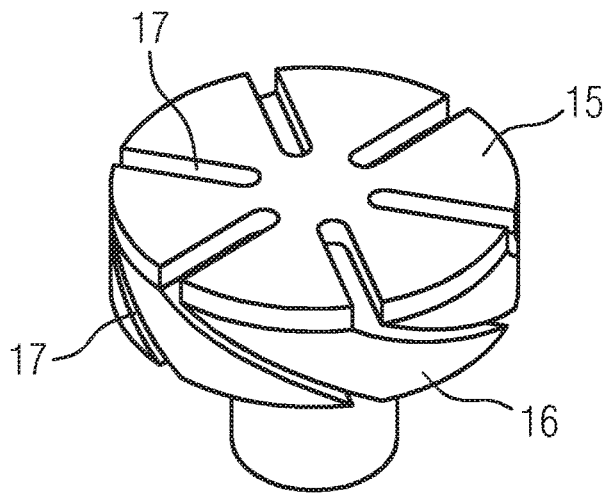
FIG. 4 shows a third switching contact.

The methods described are not limited to specific contact geometries. Instead, the methods are applicable to contact elements 5 having various contact geometries. FIG. 2 in an example manner shows a simple switching contact (plate contact) 11 consisting of a disk-shaped contact element. FIG. 3 shows a radial magnetic field (RMF) contact in the shape of a slotted pot contact having an annular contact element 13 on a slotted contact carrier 14, and FIG. 4 shows an axial magnetic field (AMF) contact having a radially slotted contact disk 15 on a helically slotted contact carrier 16. These and further contact geometries as well as the arrangement of slots 17 in the contact carrier 7 or the contact element 5, respectively, are known to a person skilled in the art and are not the subject matter of the invention.

In all cases described in the following, the spark plasma sintering (SPS) method is applied by way of example, while this is not to be understood to be limiting. Other FAST methods may likewise be applied, the special features according to embodiments of the invention being correspondingly valid for or applicable to these methods, respectively.

Figure 5:
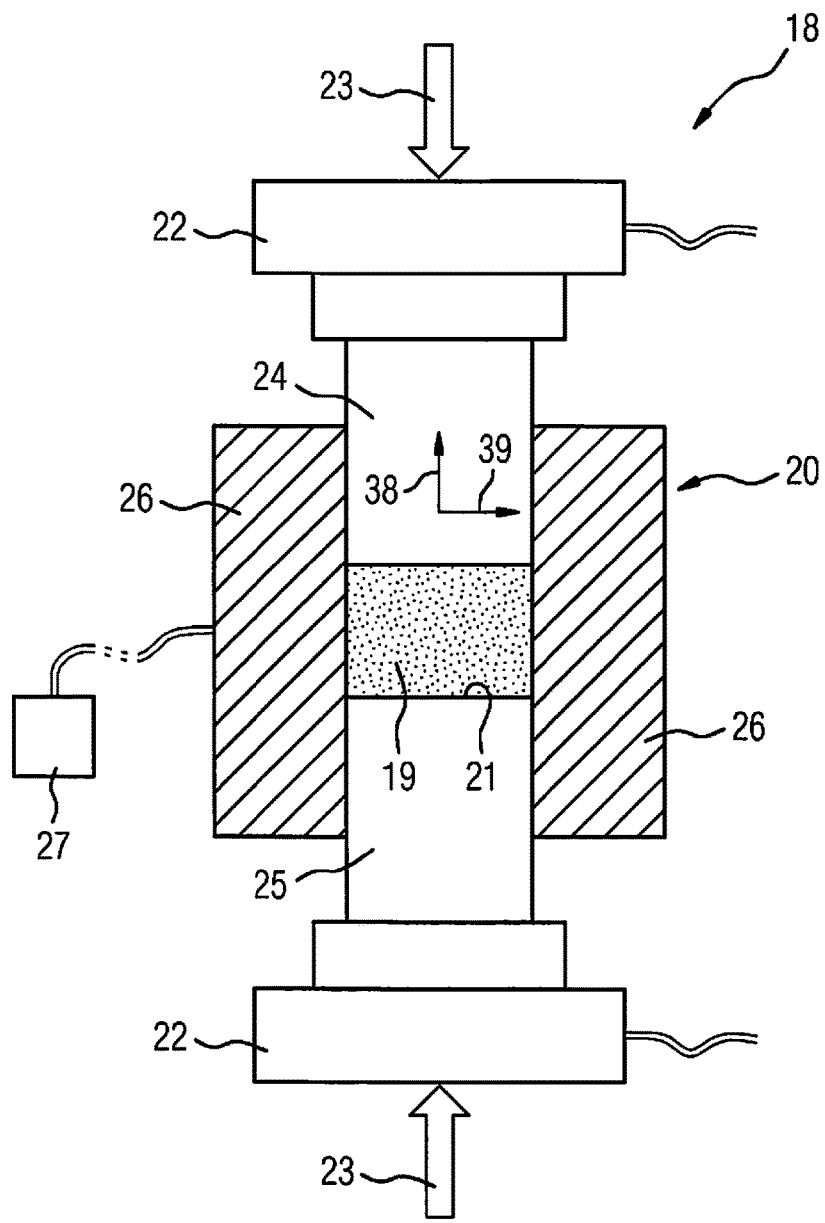
FIG. 5 shows an SPS system for producing a contact element.

The construction and the functional concept of an SPS system 18 are known to a person skilled in the art so that only the essential parts of such a system will be referred to briefly in the following. As is illustrated in FIG. 5, the pulverulent sinter material 19 which forms the later pressing blank is located on the sub-base 21 of the sintering mold (template) formed by the pressing tool 20. The pressing blank is either a semi-finished product which is not shown and which in a later intermediate step has yet to be post-machined, or is a contact element 5 which has an almost finalized contour or has already been completely shaped.

In this embodiment, both the pressing tool 20 as well as the pressing blank are directly heated. This is performed by supplying external energy via the pressing tool 20 from the outside, and by way of a direct current flowing through the pressing blank itself. To this end, two electrodes 22 which are assigned to the two outer end sides of the pressing blank are connected to a DC pulse source (not illustrated). By way of the generated electric or electromagnetic field, respectively, a sintering procedure which shapes the desired sintered body from the sinter material is initiated.

The required compression which in FIG. 5 is symbolized by two arrows 23 is generated by an upper die 24 which is connected to a hydraulic system (not depicted) and which interacts with a lower die 25. The template walls 26 are provided with temperature sensors 27 and, if and when required, with an additional electric heating (not illustrated). The pressing tool 20 is located so as to be entirely in a water-cooled vacuum container (not illustrated).

A mixture of two or more metallic or non-metallic components is used as the sinter material 19. A suitable selection of the materials is known to a person skilled in the art. In the following and unless explicitly stated otherwise, it is assumed in a merely example manner that a pulverulent copper-chromium sinter material 19 is used. A combination having, for example, 50% to 75% copper and 25% to 50% chromium has proven successful here. The exact composition of the components used, that is to say whether pure pulverulent Cr, or a copper-based material or similar is used as copper, is of minor importance in the context of embodiments of the present invention. The same correspondingly applies to all other components of the sinter material 19.

For producing a contact element 5 which is subsequently able to be connected to an electrical switching contact 3, 4 with a suitable contact carrier 7 by means of a soldering/brazing or welding operation, as is depicted in FIG. 5, in one first example embodiment of the invention a suitable pulverulent mixture, for example CuCr, is filled into a template, wherein particular attention has to be paid to grain size, grain size distribution, and purity. The template has been adapted to the shape of the semi-finished product to be produced or of the contact element 3, 4, respectively. In order for a disk-shaped contact element 3, 4 to be produced, for example, the shape is likewise embodied so as to be disk-shaped. The template is closed toward the top by inserting the upper die 24. This is followed by the sintering procedure.

Figure 12:
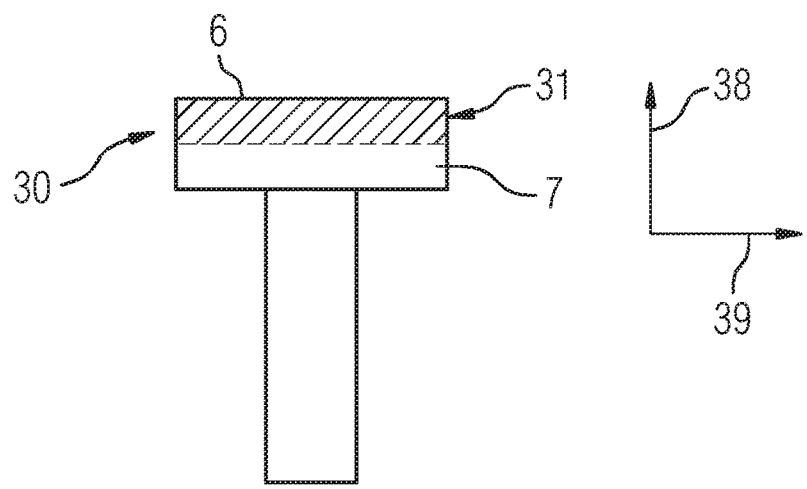
FIG. 12 shows a first contact carrier-contact element combination.

In one second example embodiment of the invention a unipartite contact carrier-contact element combination 30 is produced, see FIG. 12, in that a region 31 of an already available contact carrier 7 is modified by means of a FAST method in such a manner that this region 31 may serve as a contact element. In other words, a finished switching contact 3, 4 is produced in a single-step process.

Figure 6:
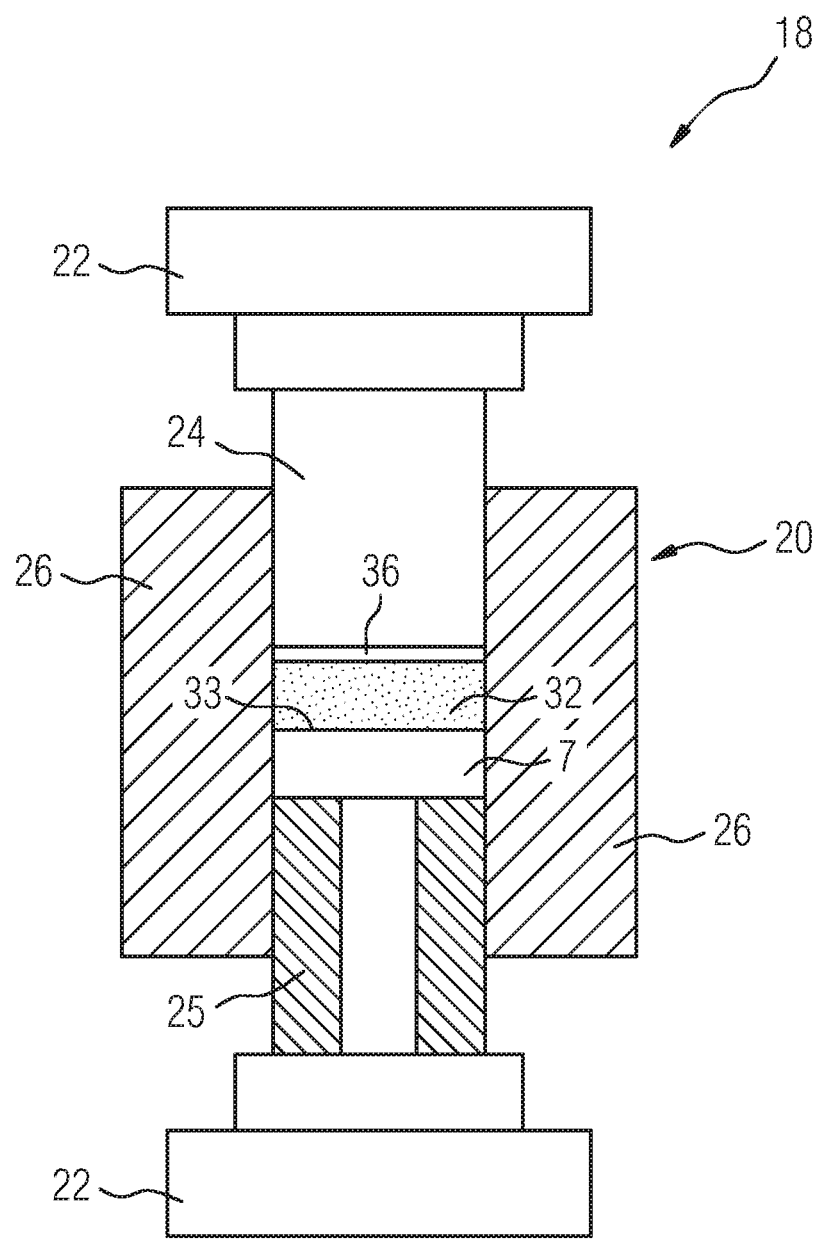
FIG. 6 shows an SPS system for producing a first contact carrier-contact element combination.

To this end the contact carrier 7 has a first component of the contact material, while a second component of the contact material is incorporated into the surface-proximate region 31 of the contact carrier. In the example described, this is a Cu contact carrier 7, into the surface-proximate region 31 of which chromium is incorporated. On account thereof, the desired CuCr contact material results in this region 31. For this purpose, a pre-shaped contact carrier 7 is inserted directly into the template of the SPS system, as is illustrated in FIG. 6. Subsequently, the quantity of the missing material component which is required for the later contact surface 6 to function, in this case pulverulent Cr 32, is distributed on the upper side 33 of the contact carrier 7. This is performed in the form of a loose bulk powder. The chromium material 32, however, may also be provided in the shape of a pre-pressed porous semi-finished product 34 (FIG. 7) or as a green tape 35 (FIG. 8) as will be described in more detail hereunder.

Subsequently to the above, in the example embodiment described here an auxiliary pressing disk 36 is placed onto the layer of pulverulent Cr 32. The auxiliary pressing disk 36 which may be optionally used is composed of a comparatively hard and preferably electrically conducting material such as metal, ceramics, graphite, or similar, so as not to negatively influence the flow of current during the sintering procedure. An auxiliary disk 36 of coated hard metal is preferably used. The auxiliary disk 36 inter alia serves as a non-stick agent and as a coupling element for the transmission of force. However, the auxiliary disk 36 above all serves as protection against wear, thus in order to avoid heavy wear on the template, which could be caused by the comparatively hard and sharp-edged pulverulent chromium 32 not softening to the usual degree at the usual process temperatures. The auxiliary disk 36 wears gradually and is replaced when and if required.

As the upper die 24 is inserted, the template is closed toward the top. In the course of the sintering procedure the pulverulent Cr 32 is pressed into the softening material of the contact carrier 7. A CuCr composite structure from a three-dimensionally cross-linked matrix phase (Cu) and a three-dimensional Cr skeleton which is interdisposed and ideally is percolated therein is created in a surface-proximate region 31 of the contact carrier 7, preferably in a region below the contact surface 6 which is between 100 μm and about 3 mm thick. The chromium grains here are in mutual contact and lend mutual support, such that they can absorb comparatively high mechanical forces.

The process parameters, in particular the process speed and the process temperature, may be selected such that physical procedures and/or chemical reactions which improve the material properties of the surface-proximate region 31 of the contact carrier 32 serving as contact element, additionally take place between the Cr and Cu phases. Here, these may be additional alloying, dissolving, and/or precipitating procedures.

Figure 13:
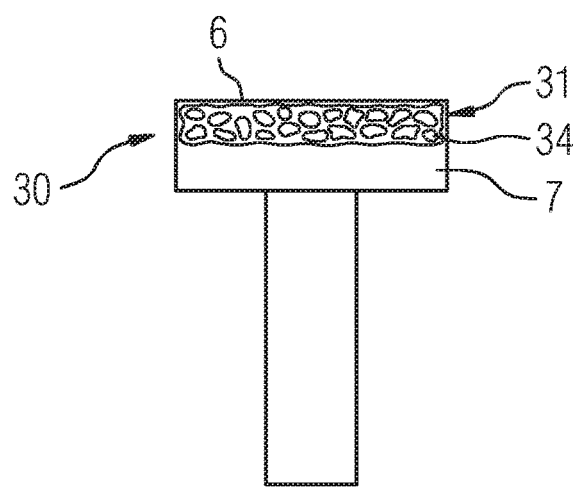
FIG. 13 shows a second contact carrier-contact element combination.

If chromium in pulverulent form or in the form of green tape is used for the region 31 which assumes the function of a contact element, the later position of the chromium in the material of the contact carrier 7 cannot be exactly predetermined without comparatively high complexity. By contrast, if the material component 32 which is to be incorporated into the contact carrier 7 is provided in the form of a porous semi-finished product 34 which during the FAST process is slowly pressed into the soft and doughy copper material of the contact carrier 7, the exact later position of the incorporated material 34 in the carrier material is known, see FIG. 13. The porous semi-finished product 34 is preferably embodied in the fashion of a sponge, having very large pores, or as a defined chromium skeleton, see FIG. 7. During the pressing procedure the cavities or intermediate spaces, respectively, which are disposed between the webs of chromium, are filled with the conductive copper material of the contact carrier 7. The shape of the semi-finished product 34 here is substantially maintained. By way of using a porous semi-finished product 34 of this type, higher material strength of the surface-proximate region 31, on the one hand, and improved control of the arc, on the other hand, is achieved.

If the FAST method is performed at comparatively high temperatures in the range of the melting temperature of copper, according to one preferred embodiment of the invention the major part of the contact carrier-contact element combination 30 is located in a cooler region of the template. To this end, a corresponding region of the template is actively cooled, if and when required. Since, moreover, the hot processing zone in FAST processes is very tightly limited, a contact carrier-contact element combination 30 which is cooled in this manner is neither deformed nor structurally modified by the sintering process. In other words, despite the high process temperatures, there are no disadvantageous effects, such as an increase in the size of crystallites, for example.

In order for the formation of the composite structure in the surface-proximate region 31 to be improved and/or accelerated during the sintering procedure, and in order for greater penetration depths (for example of up to 3 mm) to be achieved for the chromium 32 which is present in pulverulent form, it is provided in one further example embodiment of the invention for the surface-proximate region 31 of the contact carrier 7 to be configured so as to be porous or structured. In this way, depressions, grooves, or cups (not illustrated) may be provided on the upper side 33 of the contact carrier 7, for example. This simplifies the incorporation of material into the contact carrier 7. At the same time, additional compaction which promotes homogeneity is thus also enabled in the course of the FAST process.

The distribution of the pulverulent Cr 32 in the carrier material may be carried out both in the thickness direction 38, here in a manner corresponding to the axial movement direction 8 when opening or closing the contact, respectively, as well as in a radial direction 39 of the contact carrier 7, which runs in a perpendicular manner to the former, at a gradually modified concentration, as will be explained in more detail further below in the context of another example embodiment.

Figure 9:
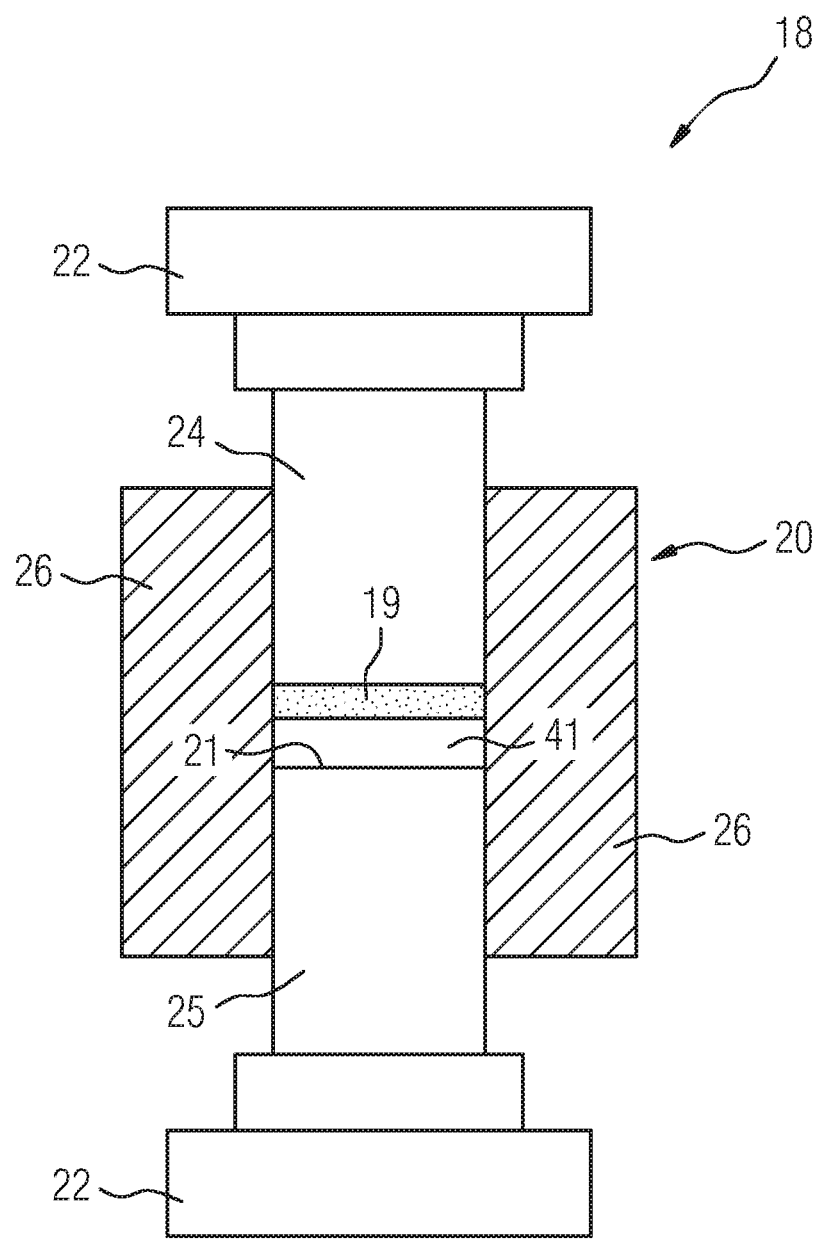
FIG. 9 shows an SPS system for producing a first contact element having an inlaid volume element.

In one further example embodiment of the invention a second contact element portion 42 is formed via a FAST method on an available first portion 41 of the contact element 5, as is illustrated in FIG. 9.

While the contact element 5 in the previously known methods for producing a contact element 5 is entirely composed of sintered powder, part of the volume of the powder 19 is now substituted with the first contact element portion 41. This first contact element portion 41 here serves as a volume element for replacing a specific pulverulent volume. The first contact element portion 41 in the example embodiment described here has the shape of a solid metal element, more specifically the shape of a metal disk. The metal element may however also be embodied in an annular manner. This volume element 41 in the form of a disk which is only a few millimeters in thickness is conductive. In the example described here, it is composed of stainless steel or copper.

In order for advantageous electromagnetic fields to be generated, the volume element 41 may be structured in a corresponding manner and may have slots 17, for example. The arrangement of slots 17 of this type is known to a person skilled in the art and does not require further discussion at this point.

In order for the FAST method (SPS) to be carried out, the pre-shaped volume element 41 is initially placed onto the base 21 of the template which is usually composed of graphite. The size of the volume element 41 here is selected such that the base 21 is completely covered. Subsequently, the quantity of pulverulent CuCr 19 which is required for the contact element 5 to function is distributed on the volume element 41, wherein the required quantity of powder is determined by the height of the contact material layer that is to be achieved. The height is typically between 0.2 mm and 3 mm.

Figure 10:
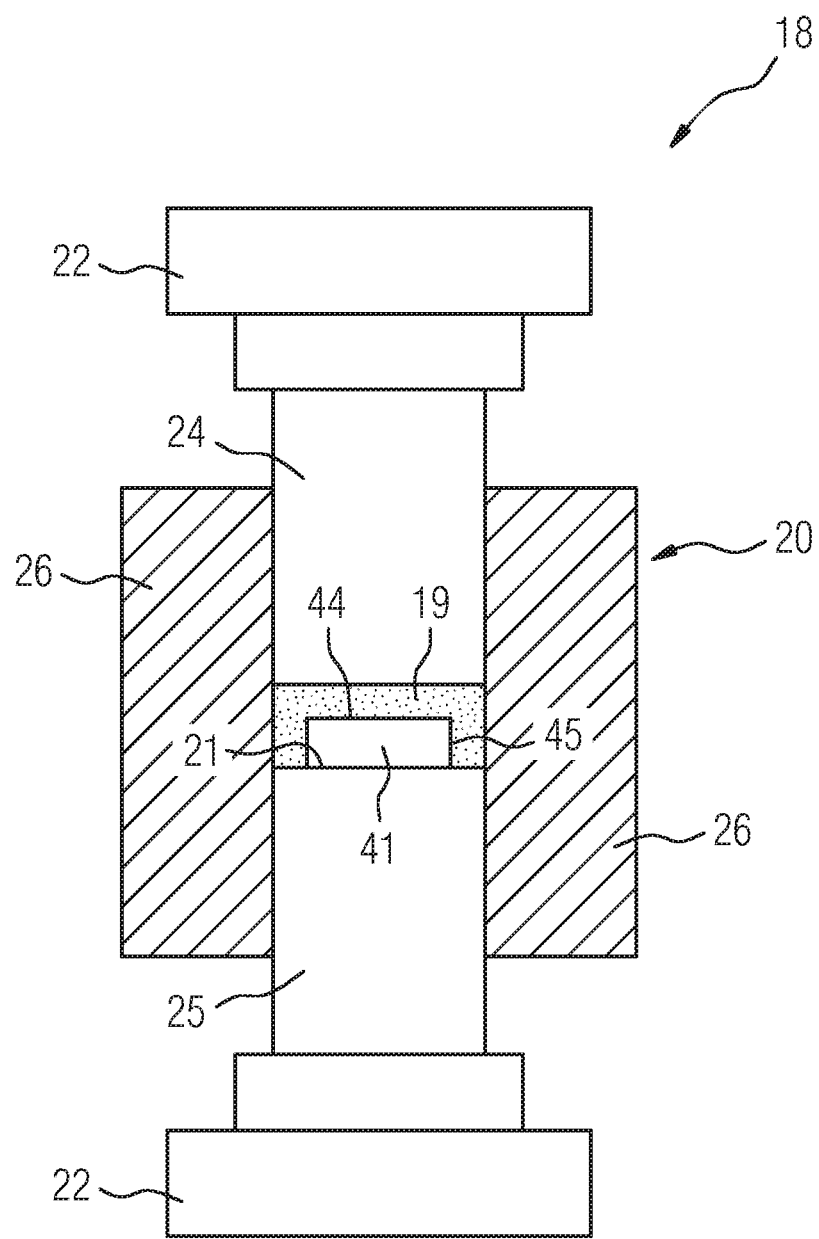
FIG. 10 shows an SPS system for producing a second contact element having an inlaid volume element.

Alternatively, the diameter of the volume element 41 is smaller than the diameter of the template, such that the volume element 41 during the subsequent sintering procedure is not only coated with contact material 19 on the cover face 44 but also on the sleeve face 45, see FIG. 10. Such a peripheral coating ensures that later on the arc during a switching procedure always impacts on contact material.

Thereafter, the template is closed with the upper die 24, as is standard practice, and the FAST process is carried out. On the one hand, the pulverulent Cu and the pulverulent Cr are interconnected during the course of the sintering procedure and form the solid CuCr contact material. On the other hand, a materially integral connection between the pulverulent copper and the volume element 41 lying therebelow is created. The contact element 5 produced in this way is subsequently connected to a contact carrier 7 in a traditional way, for example with the aid of a soldering, brazing, or welding procedure.

Figure 14:
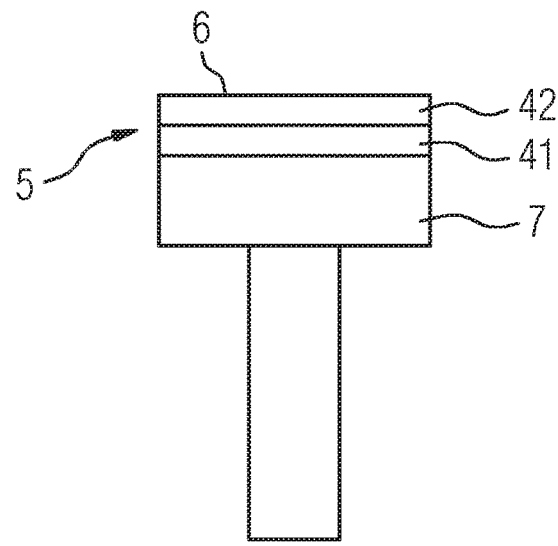
FIG. 14 shows a contact element having an inlaid volume element, which is connected to a contact carrier.

In one modified variant, the contact element 5 produced in this way is simultaneously connected to the contact carrier 7 via the FAST method. In other words, the FAST process serves simultaneously for sintering contact material and for connecting the contact element 5 to the contact carrier 7, that is to say for producing a complete switching element 3, 4 in a single-step process. To this end the completely shaped contact carrier 7 is employed instead of the base of the template, see FIG. 11. During the sintering process of the pulverulent CuCr, materially integral joining of the metal disk to the contact carrier is simultaneously performed. Such a contact element is depicted in FIG. 14.

Figure 11:
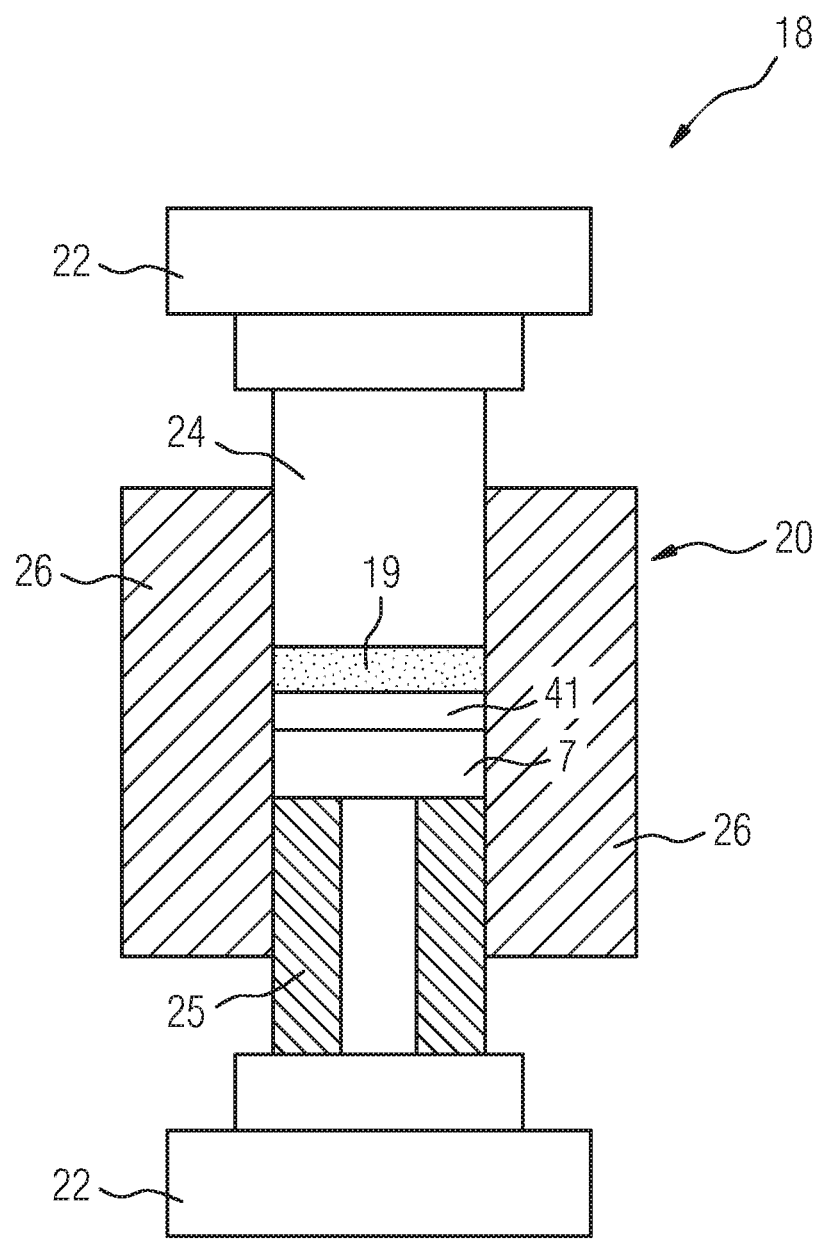
FIG. 11 shows an SPS system for producing in a single step a contact element having an inlaid volume element, which is connected to a contact carrier.

For the FAST method, the already available first portion of the contact element is usually positioned so as to be adjacent to the contact carrier, that is to say that the volume element 41 serves as a bed for the powder 19 lying thereabove, as is illustrated in FIGS. 9, 10, and 11. This is particularly advantageous when the contact carrier 7 has slots 17 for optimizing arcing. If intrusion of the powder into the slots 17 of the contact carrier 7 does not have to be prevented, the volume element 41 may also be positioned above the powder 19 (not illustrated). On account of such an arrangement, the configuration of electric fields may be influenced in an advantageous manner.

As has already been described above, the hot process zone in the case of FAST methods is highly limited, and the contact carrier 7 itself in large part is located in a cooled template, such that the contact carrier 7 is neither deformed nor structurally modified by the sintering process. While no negative effects are to be expected for these reasons, in one preferred embodiment of the invention an adapted sintering system which, on the one hand, has a hybrid heater (not depicted) and, on the other hand, permits more precise or more sensitive and in particular zone-wise monitoring and regulating of the temperatures is employed. The hybrid heater here is preferably embodied in such a manner that in addition to the automatic heating by the current flow during the plasma-sintering procedure, electric heating and thus active temperature regulation of the template walls 26 is possible.

It is very particularly advantageous when a multi-chamber FAST system is employed in which the individual process steps are carried out in chambers (not depicted) which are mutually separated. On account thereof, slow evacuation, heating and cooling processes which lead to improvements in the process, in particular to higher quality of the contact elements to be produced, without any reduction in the production rate are provided. Advantageously, the system here is configured in such a manner that sintering is performed in a second chamber, while the next component is already being prepared in an upstream first chamber, and the first chamber is evacuated. Additionally, cooling and venting for removal of the component may be performed in a third chamber.

When a correspondingly shaped template and a likewise shaped volume element, for example in the shape of the disk-shaped volume element 41, are used, further geometries, such as helical contacts, for example, may also be produced. The volume element, which in comparison with the contact material per se is far more tenacious and which typically also withstands intense plastic deformation without damage, then also leads to higher tenacity of the helical contact on account of which breakages of the contact element 5 may be avoided.

In one further example embodiment of the invention the contact material 19 prior to the sintering process is available in such a manner that the material composition of the contact material 19 and/or at least one property of the contact material 19 are/is modified in at least one body direction 38, of the contact element 5. This here is a defined gradual modification of the material composition and/or of the at least one property of the contact material 19. This particular design embodiment may be readily applied to all example embodiments which have been described above.

In one simple example embodiment a graded bulk powder is used instead of a homogenous pulverulent mixture. Grading in the thickness direction 38 of the later contact element 5 is achieved in that the pulverulent metal is filled into the template in layers which lie on top of one another, wherein in a specified number of intermediate steps, that is to say from layer to layer, pulverulent metal having an increasing proportion of chromium is used. In the simplest case each layer here contains a constant material composition.

It is particularly advantageous when in the first pulverulent metal layer, i.e. the later interface to the contact carrier 7, pure pulverulent copper is used, so as to achieve a particularly good connection to the contact carrier 7. In the uppermost layer, i.e. the later contact surface 6, CuCr having the required composition is used. The lower the height of the individual layers is set, the more homogenous the transitions in the material composition. When a suitable layering method is used and in particular with very minor layer heights, continuous or quasi-continuous modifications in the concentrations of the individual components may also be achieved.

In order for further advantageous properties of the later contact element 5 to be achieved, the individual layers in a further example embodiment may moreover have various heights. The heights of the individual layers preferably are at least in the range of the maximum grain size, so as to ensure homogenous mixing of the powders within the individual layers.

In one further example embodiment the chromium proportion is continuously increased or decreased, respectively, in that more or less pulverulent chromium, respectively, is continuously added from a twin-screw mixing system (not depicted), for example, during filling of the template.

The further steps for producing the contact element 5 then correspond to the usual procedure of the various FAST methods, for example spark-plasma sintering.

Apart from grading in the thickness direction 38 of the contact element 5, stand-alone or additional grading in the radial direction 39 of the contact element 5 may equally be advantageous, so as to influence migration of the arc or to increase the region in which the arc burns, for example. In order for such radial grading to be obtained, the above-described method is followed in an analogous manner.

It is very particularly advantageous for the functioning and the reliability of the contact element 5 when a Cr concentration which increases in an outward radial manner is provided. This is particularly easily achievable by way of the method described here and in contrast to other methods, for example arc remelting, constitutes an advantage.

Figure 8:
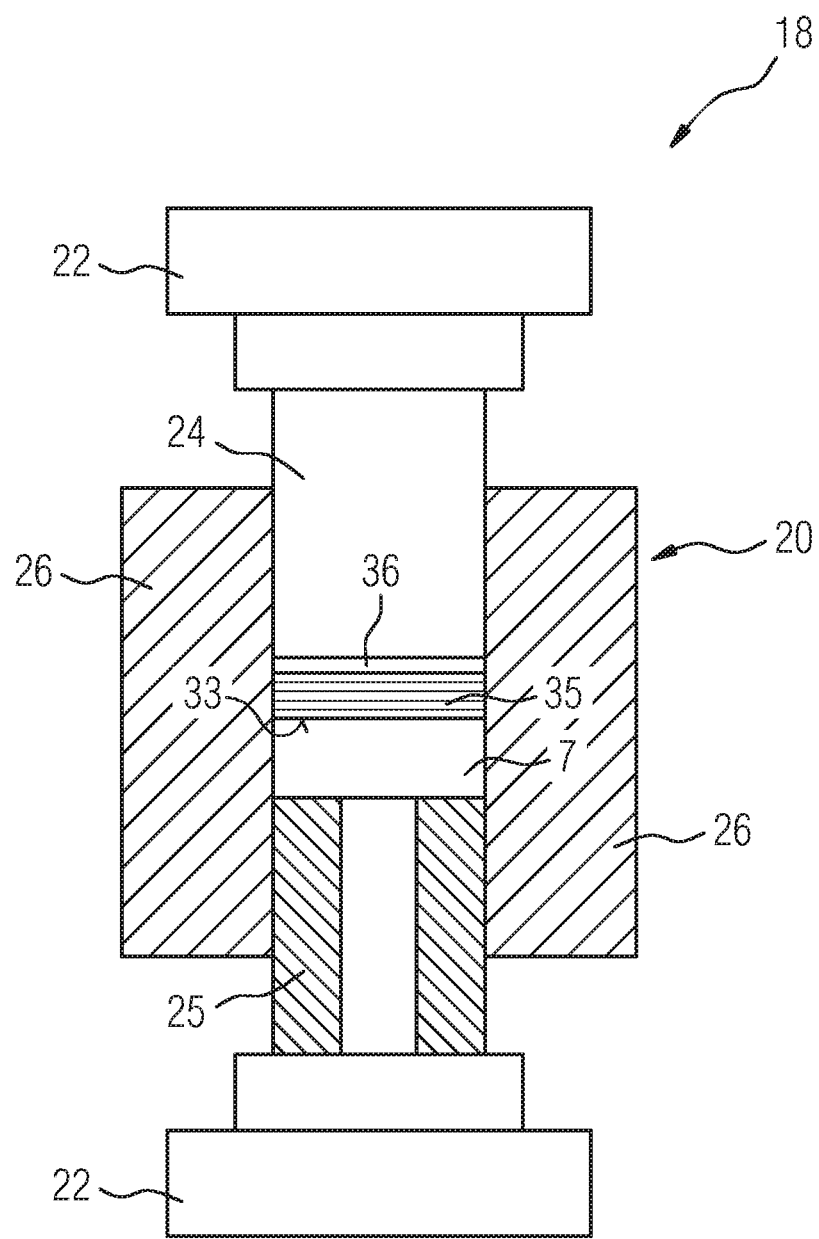
FIG. 8 shows an SPS system for producing a third contact carrier-contact element combination.

As an alternative to a correspondingly modified bulk powder, the sequence of the layers of the graded structure may also be implemented by stacking and laminating cut-to-size green tapes 35, see FIG. 8, for example. Such green tapes 35, which are composed of the corresponding pulverulent metals, for example CuCr, in an organic binder matrix, are typically produced by way of a tape casting process. Prior to sintering, the green tapes 35 are thermally or preferably chemically debindered. Moreover, structuring of the green tapes, for example by incorporating holes for improved inherent mixing and connection of the components of the individual tape layers, is possible.

Advantages of this method route are to be found in the capability of prefabrication and in potential stocking of the green and brown blanks, in ensuring tight mixing tolerances and high homogeneity requirements, and in the simple processability of the green tapes 35. The use of green tape 35 is moreover advantageous because multicomponent material systems may be provided in a particularly simple manner with the aid of the green tape, for example in that green tapes 35 having various compositions are combined with one another. In turn, additives such as tellurium and bismuth may also be incorporated into the contact element 5 in a defined manner.

The use of green tapes 35 is particularly advantageous when sintering is performed directly on structured (slotted, for example) contact carriers 7, since in contrast to the production route taken via pulverulent metals, these structures are maintained, whereas powder may make its way into the slots lying therebelow and under certain circumstances completely fills the latter. Moreover, green tapes 35 may be employed instead of the previously described metal disks as the first volume unit 41 of contact elements 5, the production method otherwise remaining unchanged. In this way, green tapes 35 and bulk powder may also be combined with one another in one preferred embodiment of the invention.

Figure 7:
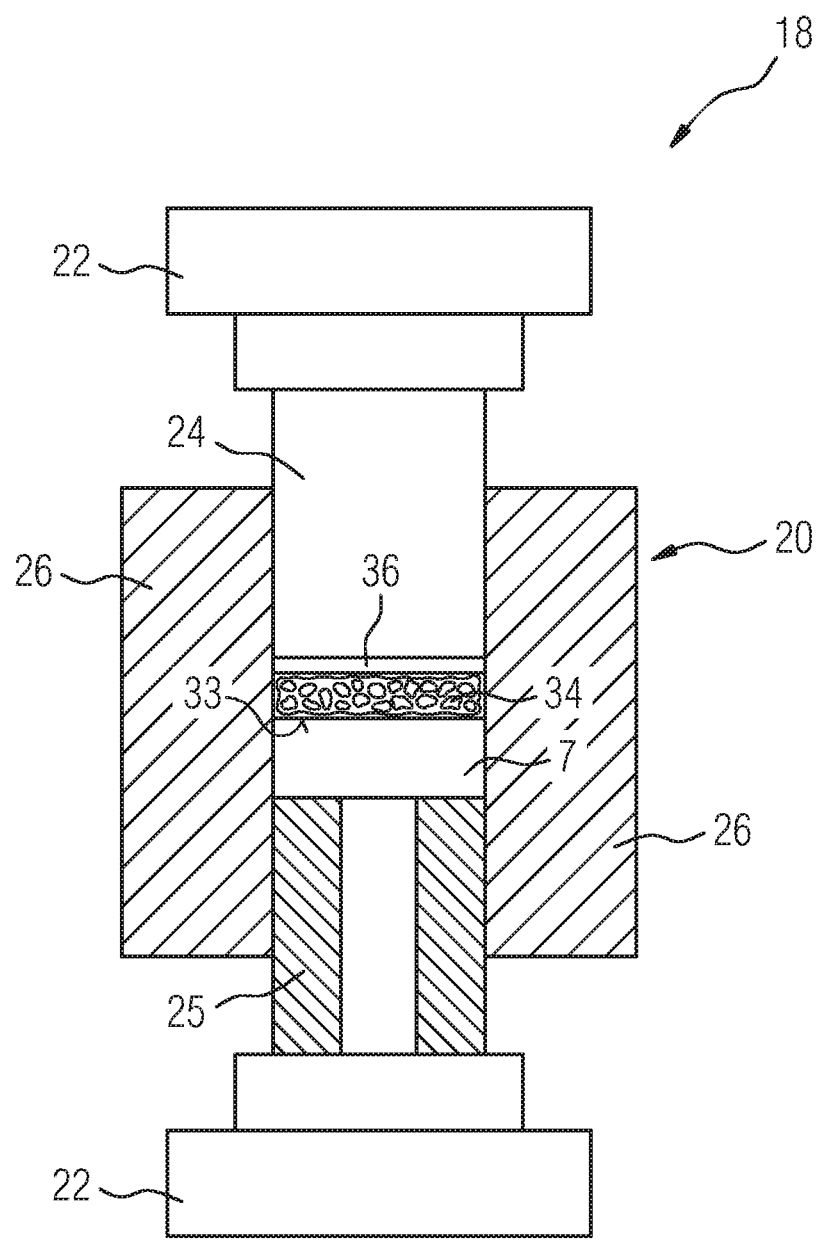
FIG. 7 shows an SPS system for producing a second contact carrier-contact element combination.

However, contact elements 5 having gradually modified material compositions or material properties, respectively, are not only producible with the aid of pulverulent primary materials 19 or of green tape 35. In this way it is also possible, for example, to achieve gradual modification of the material composition in the production of a contact carrier-contact element combination 30 in that a porous semi-finished product 34 having a density which is modified in a defined manner, see FIG. 7, is used. To this end, a porous semi-finished product 34 in which the mutual spacing of the pore ducts is modified in a defined manner in the thickness direction 38 and/or in the radial direction 39 may be used, for example.

While the invention in detail has been illustrated and described more closely by the preferred example embodiments, the invention is not limited to the disclosed examples, and other variations may be derived by a person skilled in the art without departing from the scope of protection of the invention. In particular, grading as has been last described, like the green tapes 35 or the porous semi-finished products 34, may be advantageously employed instead of a powder filling 19 in all of the methods which have been previously described.

LIST OF REFERENCE SIGNS

1 Vacuum tube
2 Switching chamber
3 Movable switching contact
4 Fixed switching contact
5 Contact element
6 Switching face, contact surface
7 Contact carrier
8 Axial direction
9 Movable connection bolt
10 Fixed connection bolt
11 Plate contact
13 Annular contact
14 Contact carrier
15 Contact disk
16 Contact carrier
17 Slot
18 SPS system
19 Sinter material, powder
20 Pressing tool
21 Sub-base
22 Electrode
23 Compression force
24 Upper die
25 Lower die
26 Template wall
27 Temperature sensor
30 Contact carrier-contact element combination
31 Surface-proximate region of the contact carrier
32 Material component
33 Upper side of the contact carrier
34 Porous semi-finished product
35 Green tape
36 Auxiliary disk
38 Thickness direction
39 Radial direction
41 First contact element portion, volume element
42 Second contact element portion 44 Cover face
45 Periphery

The invention claimed is:

1. A field-assisted sintering technology (FAST) method in which an electric or electromagnetic field at least one of supports and instigates a sintering process for producing semi-finished contact element products for at least one of electrical switching contacts and contact elements for electrical switching contacts, the method comprising:
   providing a graded contact material on a contact carrier such that a material composition of the contact material and at least one property of the contact material are modified in at least one body direction of the semi-finished contact element;
   sintering the graded contact material;
   producing a defined gradual modification of at least one of the material composition and of the at least one property of the contact material; and
   simultaneously connecting the contact material to the contact carrier via a Field Assisted Sintering Technology (FAST) method.

2. The method of claim 1, further comprising:
   producing a unipartite contact carrier-contact element combination during the sintering of the graded contact material, by providing the graded contact material on a region of a contact carrier and modifying the contact carrier via a FAST method such that the region serves as the contact element.

3. The method of claim 2, wherein the contact carrier includes a first component of the contact material, and wherein a second component of the contact material is incorporated into a surface-proximate region of the contact carrier during the sintering of the graded contact material.

4. The method of claim 1, wherein in the providing of the graded material, a pulverulent metal of the components of the contact material is filled into a template in layers which lie on top of one another, and an amount of the pulverulent metal is increased in respective layers.

5. The method of claim 4, wherein a homogeneity of a transition of the layers is set in accordance with a respective height of each of the layers of the contact material.

* * * * *